(12) United States Patent
Finlay (10) Patent No.: US 9,245,444 B2
(45) Date of Patent: *Jan. 26, 2016

(54) DETECTING TRAFFIC

(71) Applicant: Speed Information, San Jose, CA (US)

(72) Inventor: Doug Finlay, San Jose, CA (US)

(73) Assignee: Speed Information, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/639,698

(22) Filed: Mar. 5, 2015

(65) Prior Publication Data

US 2015/0179065 A1    Jun. 25, 2015

Related U.S. Application Data

(63) Continuation of application No. 12/960,846, filed on Dec. 6, 2010, now Pat. No. 9,000,946.

(51) Int. Cl.
| | |
|---|---|
| G08G 1/04 | (2006.01) |
| G08G 1/015 | (2006.01) |
| G08G 1/052 | (2006.01) |
| G08G 1/065 | (2006.01) |
| G08G 1/01 | (2006.01) |
| G08G 1/00 | (2006.01) |
| B60R 1/00 | (2006.01) |

(52) U.S. Cl.
CPC .. *G08G 1/04* (2013.01); *G08G 1/01* (2013.01); *G08G 1/015* (2013.01); *G08G 1/052* (2013.01); *G08G 1/065* (2013.01); *B60R 1/00* (2013.01); *G08G 1/00* (2013.01)

(58) Field of Classification Search
CPC .................................. G08G 1/00; B60R 1/00
USPC ........................................................ 340/942
See application file for complete search history.

(56) References Cited

U.S. PATENT DOCUMENTS

| | | | |
|---|---|---|---|
| 7,262,790 B2 | 8/2007 | Bakewell | |
| 7,454,287 B2 | 11/2008 | Manor | |
| 7,696,903 B2 | 4/2010 | Stam et al. | |
| 7,808,401 B1 | 10/2010 | Nguyen | |
| 8,461,991 B2 | 6/2013 | Botha | |
| 9,000,946 B2 | 4/2015 | Finlay | |
| 2003/0214585 A1 | 11/2003 | Bakewell | |
| 2007/0290886 A1* | 12/2007 | Stam et al. | 340/907 |
| 2010/0259383 A1* | 10/2010 | Botha | 340/565 |
| 2014/0226016 A1 | 8/2014 | Finlay et al. | |

* cited by examiner

*Primary Examiner* — Shirley Lu (57) ABSTRACT

Devices and methods for detecting traffic objects. Radiated energy is captured at a detection device, wherein the radiated energy is radiated from traffic objects. Data associated with the radiated energy is generated. The data associated with the radiated energy is transmitted using a communication device.

20 Claims, 4 Drawing Sheets

DETECTING TRAFFIC

CROSS REFERENCE TO RELATED APPLICATIONS

This application claims priority and is a continuation of the co-pending patent application Ser. No. 12/960,846, entitled "DETECTING TRAFFIC," with filing date Dec. 6, 2010, and assigned to the assignee of the present invention, which is herein incorporated by reference in its entirety.

This application is related to co-pending U.S. patent application Ser. No. 14/258,460 filed on Apr. 22, 2014 entitled "DETECTING TRAFFIC" by Doug Finlay, and assigned to the assignee of the present application.

FIELD

Embodiments of the present invention relate generally to detecting traffic.

BACKGROUND

Modern technology provides for a variety of traffic detecting devices and methods. Many such devices are expensive to manufacture and install. Additionally the devices may require power lines to be run to the device and/or a dedicated communication line. Some devices also require a portion of a roadway to be removed for the installation of the device. Removing a portion of a roadway causes traffic delays and damage to the roadway that is not easily repaired. Thus these traffic detection devices are costly and require a certain amount of infrastructure in place to operate the devices.

BRIEF DESCRIPTION OF THE DRAWINGS

The drawings referred to in this description of embodiments should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "capturing," "generating," "transmitting," "detecting," or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices.

Overview of Detecting Traffic

Various devices used for traffic detecting are costly to implement and maintain and may have limited functions. For example, a video camera for detecting traffic on a roadway may require a hard wired power source, a dedicated high speed network connection and a pole or similar mounting structure implemented solely for the use of the video camera. Costs associated with implementing the video camera include the cost to run power lines and communication lines to the video camera, the cost of the video camera and mounting structure, installation costs, as well as monthly costs for the power consumption and communication line data. Other drawbacks of using video cameras for traffic detecting are limited technology for automatically counting the number of vehicles on a roadway and measuring the speed of the vehicles as well as having to store large amounts of video records.

Another example of a traffic detecting device is an electromagnetic device installed under a roadway. Such devices also require hardwired power and a dedicated communication line. Such devices also require a roadway to be temporarily closed and a portion of a roadway to be removed and then replaced in which case the road may become uneven or the resulting seams and cracks in the roadway may cause the roadway to deteriorate faster. Such a device also is unable to distinguish different types of vehicles and may be limited to detecting vehicles in only a portion of the roadway.

Embodiments of the present technology comprise traffic detecting devices that are self powered, self contained, use wireless data communication technology and can be mounted to an existing structure on or near a roadway. The device may be self powered by utilizing solar power. For example a device may be mounted to an existing light pole on or near a roadway, have an attached solar panel, and use a wireless modem to connect to a cellular network. Such a device is low cost, self contained, can be installed in a matter of minutes to existing infrastructure without the need to close a roadway during installation.

In one embodiment, a passive infrared array is used to detect radiated infrared energy radiated from a vehicle, or other object, traveling on a roadway. Such a device is low powered as it is only required to detect radiated energy and not transmit energy such as radar is required to do. In one embodiment, one device of the present technology is mounted to an existing light-pole on the side of a roadway and is able to measure; the speed of vehicles, vehicles in more than one lane of traffic, vehicles traveling in more than one direction, count the number of vehicles traveling on a roadway, distinguish different sizes of vehicles from one another, calculate a lane occupancy on a roadway, and can measure the temperature of the surface of the roadway.

In one embodiment, the traffic device further includes an image receiving device such as a camera for capturing images of traffic objects. For example, an image may be captured and transmitted upon request from a remote user. In another embodiment, a remote computer system may automatically request the image receiving device to capture an image. The image is then sent to a user with an automatic traffic alert. In one embodiment, the image is not analyzed by a computer system to detect traffic objects, but is only used for a visual inspection of traffic conditions.

The following discussion will demonstrate various hardware, software, and firmware components that are used with and in devices and computer systems used for detecting traffic in various embodiments of the present technology. Furthermore, the devices, computer systems and their methods may include some, all, or none of the hardware, software, and firmware components discussed below.

Embodiments of Detecting Traffic

Figure 1:
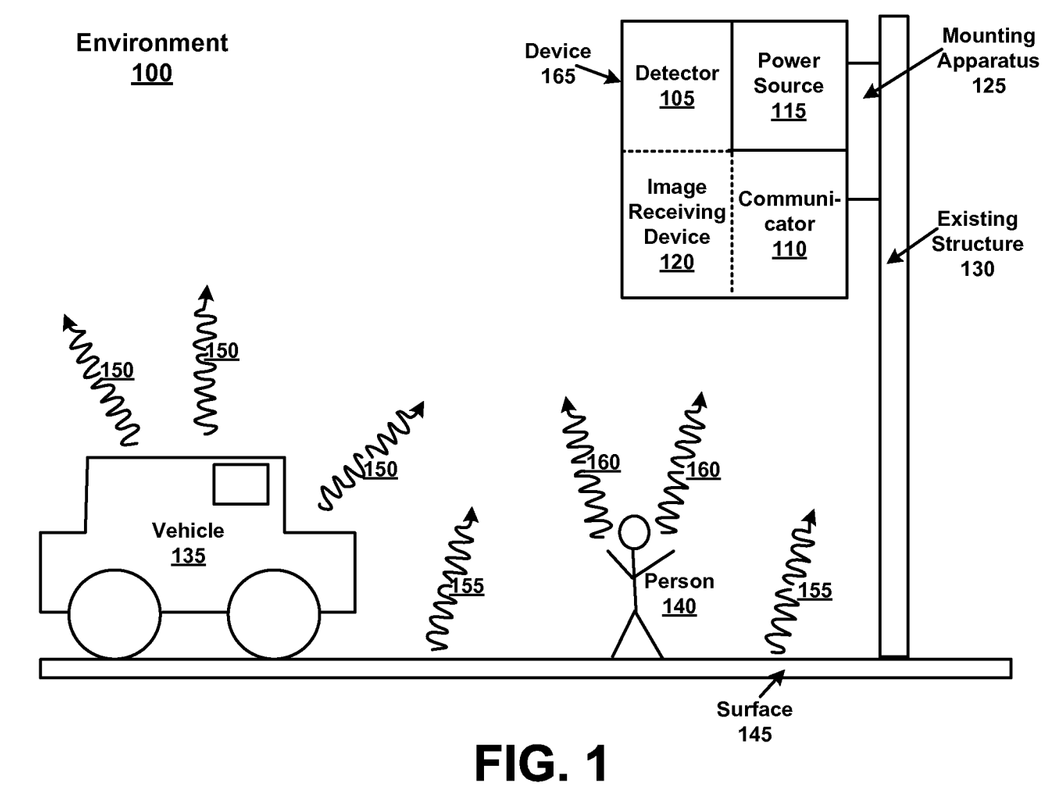
FIG. 1 illustrates a block diagram of a traffic detector in an example traffic environment in accordance with embodiments of the present technology.

With reference now to FIG. 1, a block diagram of an example environment comprising a traffic detecting device shown in accordance with embodiments of the present technology. Environment 100 includes detector 105, communicator 110, power source 115, image receiving device 120, mounting apparatus 125, existing structure 130, vehicle 135, person 140, surface 145, device 165 and radiated energy 150, 155 and 160. Environment 100 comprises components that may or may not be used with different embodiments of the present technology and should not be construed to limit the present technology.

FIG. 1 depicts, in one embodiment, detector 105, communicator 110, power source 115, and image receiving device 120 as part of device 165. It should be appreciated that these components may or may not be part of the same device. For example, device 165 may not include image receiving device 120.

In one embodiment, detector 105 is a passive infrared detector configured to detect infrared radiation that is radiated from a traffic object. It should be appreciated that traffic objects may be, but are not limited to vehicles, automobiles, motorcycles, semi-trucks, human beings, and the surface of a roadway. In one embodiment, detector 105 detects infrared radiation that is emanating from vehicle 135.

In one embodiment, detector 105 is a passive infrared detector that uses a two dimensional array to detect traffic objects. In one embodiment, detector 105 is a thermopile array. For example, the two dimensional array may be a 16×16 pixel passive infrared array behind a gallium arsenide lens with a field of view aimed at a roadway. The angle of the field of view may vary, in one embodiment, the field of is 70 degrees. As traffic objects pass into the field of view they will radiate infrared energy. The radiated infrared energy passes through the lens and the array captures the energy and generates related traffic data. This data is then sent using communicator 110 to a database or other electronic repository. The data may then be analyzed to make determinations regarding traffic patterns. The present technology should not be construed to be limited to detecting and/capturing infrared radiation as other forms of radiated energy may be detected or captured for traffic detecting.

In one embodiment, the data is sent to a server computer system. The server computer system may identify a field of view of detector 105 and establish trap zones at either end of the field of view. For example, a trap zone may be defined as a portion of a roadway that is several feet in diameter with a corresponding trap zone separated by 20-30 feet. The trap zones may then be sent back to detector 105 to be used in generating the traffic data.

In one embodiment, vehicle 135 may travel over surface 145 and pass over a portion of surface 145 that is in the field of view of detector 105. In one embodiment, the vehicle 135 passes through two trap zones established in the field of view of detector 105. While vehicle 135 is passing through the field of view of detector 105, vehicle 135 captures radiated energy 150 which is radiated by vehicle 135. This energy is used to generate data regarding vehicle 135. Surface 145 may be, but is not limited to, a roadway, a freeway, an interstate, a highway, a road, a street, a dirt road, or other natural or manmade terrain.

In one embodiment, the data regarding vehicle 135 is related to the speed that vehicle 135 is traveling. For example, when vehicle 135 is traveling in a lane on a roadway and enters a trap zone in a field of view of detector 105, it will be detected by the first passive infrared pixel in the lane. When vehicle 135 leaves the trap zone, its departure will be detected by the last passive infrared pixel in that lane. Examining how far apart the two pixels are pointed on the roadway, and looking at the number of frames that have elapsed, the speed of the vehicle by lane can be calculated.

In one embodiment, the hardware used for detector 105 is sensitive enough to detect the speed of vehicles traveling at freeway speeds. To accomplish this, pixels in an infrared detector array will be sampled at a rate fast enough to ensure that vehicles are not missed. For example, if vehicle is traveling at 100 miles per hour (approximately 45 meters per second), then three meter motorcycle would pass through a point on the roadway in 67 milliseconds. Therefore a passive infrared array should use a sample rate of at least 15 Hertz to ensure that it will capture a 3 meter vehicle traveling at 100 mph. However, other sample rates may be used for different situations. At high speeds detector 105 may increase the length of the trap zone and reduce the sample rate.

In one embodiment, device 165 will buffer several samples of the received radiated energy and process a group of them at a time. This may allow a reduction power and/or an increase in sample rate if there are algorithmic advantages to using several samples, rather than just the current sample, to determine count and speed. In one embodiment, device 165 will over-sample radiated energy of a traffic object several times to generate data regarding the traffic object. The over-sampled data will then be processed using algorithms and filters to reduce noise, increase contrast, and eliminate static objects. By using this over-sampling technique, a lower quality and more inexpensive sensor may be used for detector 105.

In one embodiment, the data regarding vehicle 135 is related to a lane occupancy of the lane that vehicle 135 is traveling in on surface 145. Lane occupancy may be calculated as a percentage of time in which vehicles are occupying a lane on a roadway in the field of view of detector 105 for a given time period. In one embodiment, the data regarding vehicle 135 is related to a count of a number of vehicles traveling through the field of view of detector 105 during a given time period.

In one embodiment, the data regarding vehicle 135 is related to a height of vehicle 135. In one embodiment, the data regarding vehicle 135 is related to a length of vehicle 135. Data related to the height and/or length of vehicle 135 may be used to classify which to of vehicle that vehicle 135 is. For example, if vehicle 135 is below a certain length, such as 10 feet, then vehicle 135 would be classified as a motorcycle. In one embodiment, vehicle classifications are as follows: 10 feet long is classified as a motorcycle, 20 feet long is classified as a passenger car or automobile, 30 feet long is classified as a small truck, 40 feet long or longer is classified as a large truck or semi-truck. In one embodiment, measurements regarding length and height of vehicle 135 are made by counting the number of passive infrared pixels that are illuminated at a given time by vehicle 135. Thus the present technology can not only count the number of vehicles on a roadway, but can also classify which types of vehicles are traveling on the roadway.

In one embodiment, detector 105 captures radiation energy 155 that is radiated from surface 145. Radiation energy 155 may be captured simultaneous to or in a time period consecutive to the time period in which radiation energy 150 is captured. In this example, radiation energy 155 is considered background radiation. This background radiation may be analyzed to determine the temperature of surface 145. To accomplish this, detector 105 will calibrate the background image to ambient temperature and estimate the temperature of the background image. In so doing, it will be able to determine road surface temperatures within one degree. Temperature information may be useful in making decisions as to when to clear snow and ice from roads. For example, the information can allow an inference to be made as to which roads are melting snow and ice and which roads need to be plowed and salted.

In one embodiment, detector 105 captures radiation energy 160 that is radiated from person 140 where person 140 is a human being. This information may be useful to detect the number and frequency of people in a crosswalk in a roadway. The present technology may also be practiced in other situations where counting and detecting people are desirable such as at border between states or nations. In one embodiment, device 165 is configured to only detect people or vehicles, but not both. In one embodiment, device 165 is configured to detect both people and vehicles.

In one embodiment, power source 115 comprises a battery and utilizes solar power to charge the battery. In one embodiment, a solar panel may be employed by device 165. In one embodiment, device 165 employs adaptive power management that automatically changes system operation based on battery charge and solar panel performance.

Power source 115 is selected to allow device 165 to transmit data at regular intervals. During peak traffic hours device 165 may be transmitting at intervals faster than during off peak traffic hours. For example, device 165 may transmit at 60 second intervals during peak hours and five minute intervals during off peak hours. The different in power consumption for different intervals may be averaged to estimate power requirements for device 165. Using this information, appropriate batteries and solar devices may be selected. In one embodiment, the battery may be a standard battery purchased off the shelf or a battery may be modified for the present technology. It should be appreciated that power source 115 may utilize other conventional power sources such as being hard wired to a power grid.

The present technology may require that a solar panel is mounted on existing structures such as a pole. Mounting a solar panel on a pole may cause an increase of force to be applied to the existing structure as wind impacts the solar panel. Therefore the size of the solar panel may be selected with consideration to the extra force will be applied to the existing structure when wind impacts the solar panel. In one embodiment, the size of a solar panel is selected such that if it is mounted to an existing structure it will limit the force applied to the existing structure when wind impacts the solar panel.

In one embodiment, device 165 may employ standard computer hardware and software to process data from detector 105, image receiving device 120 and to control the components of device 165. Such hardware and software is capable of receiving commands from an external device or computer system. For example, device 165 may receive a command from an external device to shutdown or restart. Such commands may also include adjustments to the sampling rate of detector 105 or a command for image receiving device 120 to capture an image.

In one embodiment, communicator 110 is employed to transmit and receive electronic data. In one embodiment, communicator 110 is a modem connected to a network. In one embodiment, communicator 110 is a cellular modem wireless connected to a cellular network. In one embodiment, communicator 110 establishes and maintains a continuous connection on a network. In one embodiment, communicator 110 is capable of being regularly powered on and off, or placed in a sleep state, to reduce power consumption. Communicator 110 may be powered on and off by control circuits associated with device 165 or by remote control from an external device or computer system. In one embodiment, communicator 110 also comprises a remote wireless data link such as a Bluetooth, wifi or zigbee communicator. Such a remote wireless data link may allow device 165 to communicate with other similar devices nearby or with a nearby diagnostics tool. Therefore device 165 may be capable of receiving data from a nearby device and forwarding that data over its modem. This may be useful for a nearby device that lacks a modem connection to a network.

In one embodiment, mounting bracket is employed to mount device 165 to existing structure 130. It should be appreciated that mounting apparatus 125 may use standard hardware for fastening and mounting such as screws, nuts and bolts, clamps, etc. It should also be appreciated that existing structure 130 may be a pole, a light pole, a sign, sign pole, an overpass, a bridge or other existing structures on or new a roadway. Installing device 165 on an existing structure reduces the expense and the time required to installing device 165. In one embodiment, an original structure or a new structure may be installed for device 165.

In one embodiment, device 165 also comprises a global positioning device. This enables device 165 to also transmit data regarding its location with precision and will allow a database to keep more precise records as to where a plurality of devices are located. In one embodiment, device 165 also comprises an on-board temperature sensor so that data regarding the temperature of device 165 may be transmitted.

In one embodiment, image receiving device 120 is capable of capturing images of traffic objects in the form of electronic data. It should be appreciated that image receiving device 120 may be, but is not limited to, a digital camera, a CMOS imaging array, or other similar device. In one embodiment, image receiving device 120 does not continuously operated, but instead captures images only on demand. Such a demand may come as a command from device 165, an external device or computer system. Such a command may be automatically generated based on a change in traffic patterns deduced by the data captured by device 165. Examples of changes in traffic patterns include a sudden drop in traffic speeds or a blockage in one lane. Such a command may also be received from a remote user. Communicator 110 may be used to receive such commands and transmit data related to the images captured by image receiving device 120.

In one embodiment, image receiving device 120 is capable of capturing video. In one embodiment, real-time video captured by image receiving device 120 may be transmitted for limited amount of time.

In one embodiment, image receiving device 120 is capable of adjusting a viewing range or area for image receiving device 120 adjusting the zoom of a lens associated with image receiving device 120. In one embodiment, image receiving device 120 is capable of panning or tilting the lens to adjust a viewing range or area for image receiving device 120. Commands to pan, tilt or zoom may be received automatically based on traffic conditions or may be received at the request of a user. Thus images encompassing more than one area of a roadway may be captured and transmitted upon demand. This may be useful if an operator or user notices a change in traffic behavior and would like to have a visual image of what is occurring. For example, traffic patterns may change and an operator request an image, the image displays a fallen tree across a roadway. Personnel may then be dispatched to remove the tree.

In one embodiment, detector 105 uses hardware and techniques associated with Doppler radar to detect traffic objects. For example, detector 105 may transmit energy towards the traffic objects and receive the energy reflect back off of the traffic objects. A shift in energy detected between the transmitted energy and the reflected energy can be used to detect the traffic objects. The use of Doppler radar is well known in the art, for a discussion of using Doppler radar to detect traffic objects please see U.S. Pat. No. 7,558,695.

In one embodiment, data transmitted by communicator 110 is received by at least one server computer system. The server computer system is capable of maintaining a database of a plurality of devices similar to device 165 and the devices' sensor status and metrics. The server computer system can also provide alerts for devices that need attention. The server computer system can also maintain and manage communications and upload new versions of software to the devices. Additionally, the server computer system can maintain a customer rules engine on when to send alerts to a customer, when to send an image based on current traffic conditions and correct reported data to fix mistakes in the device data based on current conditions to improve accuracy.

In one embodiment, the data transmitted by communicator 110 is received by at least one server computer system that has at least one Extensible Markup Language (XML) client. The server computer system can establish and maintain a secure communications channel with the XML client, filter data to restrict the XML client to only access authorized data, and populate a customer database for use in other applications.

In one embodiment, the data transmitted by communicator 110 is received by at least one map server. The map server is configured to associate traffic data with a section of road, color-code the section of road based on conditions, alert a customer to rapidly changing conditions, enable user to click on a device displayed in a graphical user interface and retrieve an image of current conditions on demand.

Figure 2:
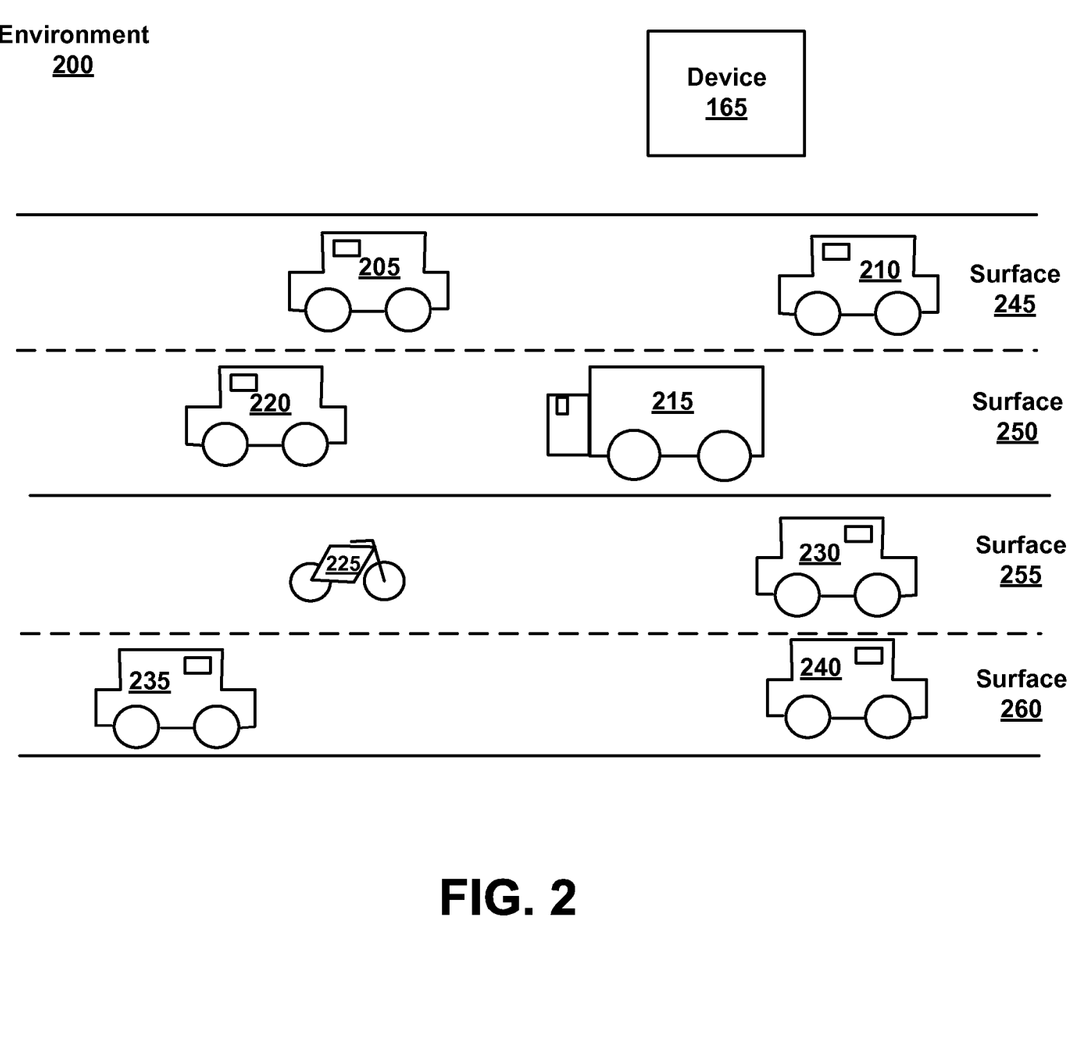
FIG. 2 illustrates a block diagram of a traffic detector in an example traffic environment in accordance with embodiments of the present technology.

With reference now to FIG. 2, a block diagram of an example environment comprising a traffic detecting device shown in accordance with embodiments of the present technology. Environment 200 includes vehicles 205, 210, 215, 220, 225, 230, 235 and 240, lanes 245, 250, 255 and 260 and device 165. Environment 200 comprises components that may or may not be used with different embodiments of the present technology and should not be construed to limit the present technology.

FIG. 2 depicts device 165, it should be appreciated that device 165 of FIG. 2 has all the features and capabilities of device 165 of FIG. 1. In one embodiment, device 165 is capable of detecting or capturing energy radiated from vehicles 205, 210, 215, 220, 225, 230, 235 and 240 as the pass the field of view of device 165. Using the captured data, information relating to speed, lane occupancy, height and length of vehicles, number of vehicles, and other information can be determined. Based on the information regarding height, vehicles 205, 210, 220, and 235 may be classified as passenger cars while vehicle 215 may be classified as a large truck and vehicle 225 may be classified as a motorcycle.

In one embodiment, device 165 is not completely accurate. For example, vehicles 230 and 240 may be driving side by side at the same rate of speed as they pass through the field of view of device 165. This may cause device 165 to collect data that may appear as though vehicles 230 and 240 are one vehicle that has an abnormal height. By using algorithms and other techniques, vehicles that appear to be too tall or have an abnormal height may be classified as two vehicles instead of one. This technique provides error correction for data captured by device 165 when two vehicles are driving side by side at the same rate of speed.

FIG. 2 depicts lanes 245, 250, 255 and 260. Each of these lanes represents a lane of travel on a roadway. FIG. 2 depicts vehicles in lanes 245 and 250 traveling in the opposite direction of vehicles in lane 255 and 260. In one embodiment, device 165 is capable of capturing energy radiated by vehicles traveling in more than one direction on a roadway. In one embodiment, device 165 may be limited to detect vehicles traveling in only one direction of travel.

Operation

More generally, in embodiments in accordance with the present invention, detecting traffic is utilized to detect traffic object and their characteristics on a surface. Such methods can be implemented at devices as described above that are configured to detect traffic objects.

Figure 3:
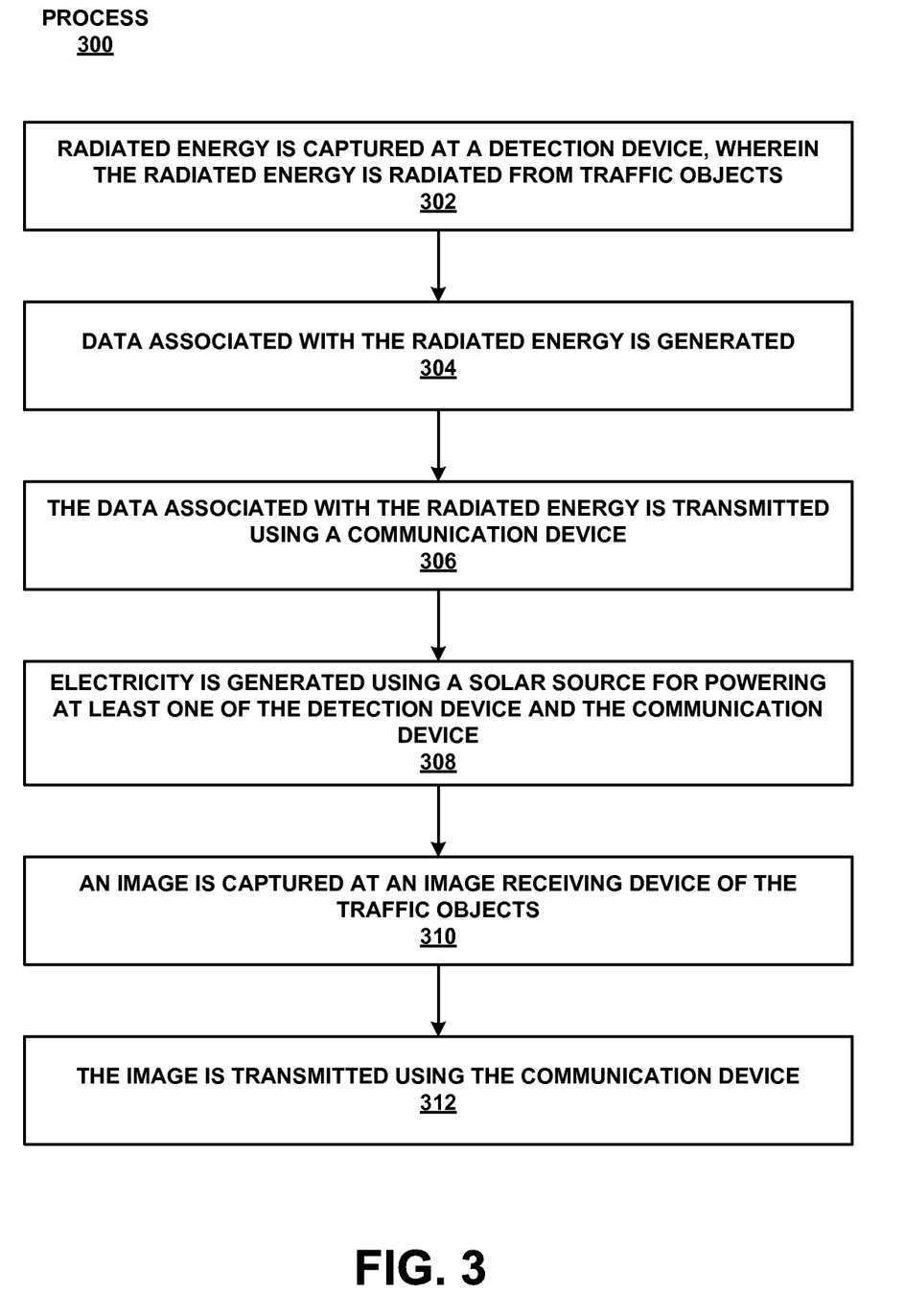
FIG. 3 illustrates a flowchart of an example method for detecting traffic in accordance with embodiments of the present technology.

FIG. 3 is a flowchart illustrating process 300 for detecting traffic, in accordance with one embodiment of the present invention. In one embodiment, process 300 is carried out, at least in part, by processors and electrical components under the control of computer readable and computer executable instructions stored on a computer-usable storage medium. The computer readable and computer executable instructions reside, for example, in data storage features such as computer usable volatile and non-volatile memory. However, the computer readable and computer executable instructions may reside in any type of computer-usable storage medium. In one embodiment, process 300 is performed by devices and objects in FIGS. 1 and 2.

In one embodiment, process 300 is used to detect traffic. It should be appreciated that the steps of process 300 may not need to be executed in the order they are listed in. Additionally, embodiments of the present technology do not require that all of the steps of process 300 be executed to detect traffic. At 302, in one embodiment, radiated energy is captured at a detection device, wherein the radiated energy is radiated from traffic objects. For example, the detection device may be device 165 of FIG. 1 with all of the abilities and features described above. The traffic object may be a vehicle, a person, a surface, a roadway, etc.

At 304, data associated with the radiated energy is generated. The data may contain information related to, the speed of a traffic object, the height or length of a traffic object, the temperature of a traffic object, the lane occupancy of a surface, a classification of a traffic object, a count of traffic object, as well as other information.

At 306, the data associated with the radiated energy is transmitted using a communication device. In one embodiment, the communication device is communicator 110 of FIG. 1.

At 308, electricity is generated using a solar source for powering at least one of the detection device and the communication device.

At 310, an image is captured at an image receiving device of the traffic objects. In one embodiment, the image receiving device is image receiving device 120 of FIG. 1.

At 312, the image is transmitted using the communication device. In one embodiment, the communication device is communicator 110 of FIG. 1.

Figure 4:
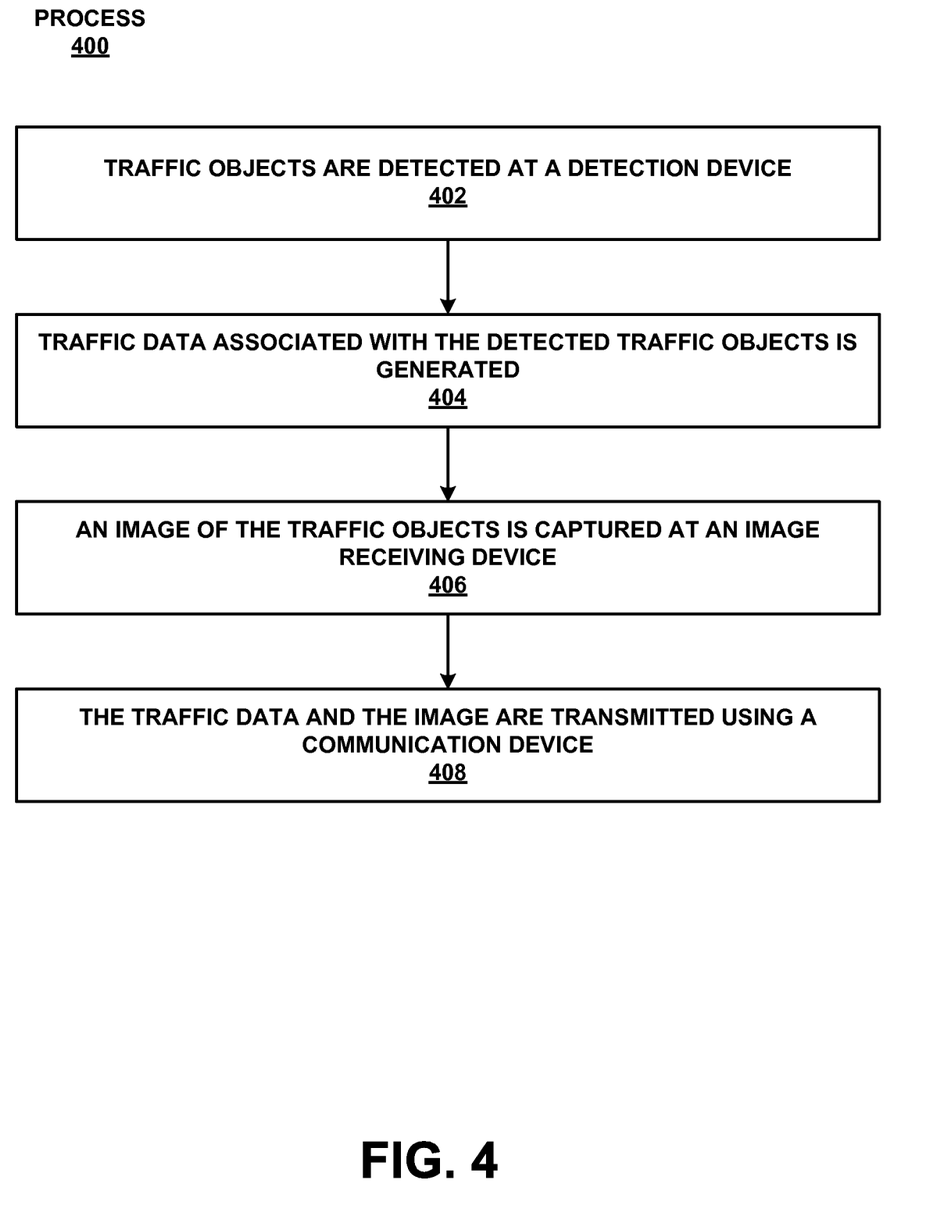
FIG. 4 illustrates a flowchart of an example method for detecting traffic in accordance with embodiments of the present technology.

FIG. 4 is a flowchart illustrating process 400 for detecting traffic, in accordance with one embodiment of the present invention. In one embodiment, process 400 is carried out, at least in part, by processors and electrical components under the control of computer readable and computer executable instructions stored on a computer-usable storage medium. The computer readable and computer executable instructions reside, for example, in data storage features such as computer usable volatile and non-volatile memory. However, the computer readable and computer executable instructions may reside in any type of computer-usable storage medium. In one embodiment, process 400 is performed by devices and objects in FIGS. 1 and 2.

In one embodiment, process 400 is used to detect traffic. It should be appreciated that the steps of process 400 may not need to be executed in the order they are listed in. Additionally, embodiments of the present technology do not require that all of the steps of process 400 be executed to detect traffic. At 402, traffic objects are detected at a detection device. In one embodiment, the traffic objects are the vehicles of FIGS. 1 and 2 and the detection device is device 165 of FIG. 1. In one embodiment, the detection device is a passive infrared array. In one embodiment, the detection device employs Doppler radar to detect the traffic objects.

At 404, traffic data associated with the detected traffic objects is generated. This may be performed using the components of device 165 of FIG. 1 including computer hardware as described above.

At 406, an image of the traffic objects is captured at an image receiving device. In one embodiment, the image receiving device is image receiving device 120 of FIG. 1. In one embodiment, a user may request the image to be captured. In another embodiment, the image is automatically captured based on a change in traffic data.

At 408, the traffic data and the image are transmitted using a communication device. In one embodiment, the communication device is communicator 110 of FIG. 1.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A device for detecting traffic objects, said device comprising:
    a detector comprising a passive array of infrared sensors configured to capture radiated energy within a trap zone defined within a field of view of said at least three infrared sensors wherein said radiated energy is infrared and said detector is further configured to generate data associated with said radiated energy by buffering several samples of said radiated energy within said trap zone, wherein said radiated energy is radiated from traffic objects;
    a wireless communicator configured to wirelessly transmit said data associated with said radiated energy; and
    a power source configured to provide power to said detector and said communicator.

2. The device of claim 1 wherein said power source is wireless and self-contained.

3. The device of claim 1 wherein said power source utilizes solar energy.

4. The device of claim 1 wherein said power source is hard wired to a power grid.

5. The device of claim 1 wherein said passive array is a two dimensional passive array to capture said radiated energy.

6. The device of claim 1 wherein said data associated with said radiated energy contains information related to a speed of said traffic object.

7. The device of claim 1 wherein said radiated energy is generated by said traffic objects traveling in more than one direction.

8. The device of claim 1 wherein said detector is further configured to over-sample said data associated with said traffic objects.

9. The device of claim 1, further comprising:
    an image receiving device for capturing images of said traffic objects;
    wherein said communicator is further configured to transmit said images of said traffic objects.

10. The device of claim 1, further comprising:
    a mounting apparatus configured for mounting said detector, said communicator and said power source to an existing structure.

11. The device of claim 10 wherein said radiated energy is generated by said traffic objects disposed in multiple lanes of said roadway.

12. A device for detecting traffic objects, said device comprising:
    a detector comprising a passive array of infrared sensors configured to capture radiated energy within a trap zone defined within a field of view of said at least three infrared sensors wherein said radiated energy is infrared and said detector is further configured to generate data associated with said radiated energy by buffering several samples of said radiated energy within said trap zone, wherein said radiated energy is radiated from traffic objects;
    a wired communicator configured to transmit said data associated with said radiated energy over a hard wired connection; and
    a power source configured to provide power to said detector and said communicator.

13. The device of claim 12 wherein said power source is wireless and self-contained.

14. The device of claim 12 wherein said power source utilizes solar energy.

15. The device of claim 12 wherein said power source is hard wired to a power grid.

16. A device for detecting traffic objects, said device comprising:
    a detector comprising a passive array of infrared sensors configured to capture radiated energy within a trap zone defined within a field of view of said at least three infrared sensors wherein said radiated energy is infrared and said detector is further configured to generate data associated with said radiated energy by buffering several samples of said radiated energy within said trap zone, wherein said radiated energy is radiated from traffic objects;

a communicator configured to transmit said data associated with said radiated energy; and a self-contained power source configured to provide power to said detector and said communicator wherein said self-contained power source is wireless.

17. The device of claim 16 wherein said self-contained power source utilizes solar energy.

18. The device of claim 16 wherein said communicator is a wireless modem configured to wireless transmit said data.

19. The device of claim 16 wherein said communicator is hard wired to transmit said data.

20. The device of claim 16 wherein said detector is further configured to over-sample said data associated with said traffic objects.

* * * * *